(No Model.)

D. H. GOODWILLIE.
CAUTERY ELECTRODE AND SHIELD.

No. 359,506. Patented Mar. 15, 1887.

Witnesses
Geo. W. Breck
Carrie E. Ashley

Inventor
David H. Goodwillie
By his Attorney
W. H. Kenyon

UNITED STATES PATENT OFFICE.

DAVID H. GOODWILLIE, OF NEW YORK, N. Y.

CAUTERY ELECTRODE AND SHIELD.

SPECIFICATION forming part of Letters Patent No. 359,506, dated March 15, 1887.

Application filed August 13, 1886. Serial No. 210,794. (No model.)

*To all whom it may concern:*

Be it known that I, DAVID H. GOODWILLIE, a resident of New York city, in the county and State of New York, have invented a new and useful Improvement in Cautery Electrodes and Shields for the Same; and I hereby declare the following to be a full, clear, and exact description of the same, reference being had to the accompanying drawings and the letters and figures of reference marked thereon, which form a part of this specification.

The object of my invention is to so construct the electrode and to so shield it that it can be introduced into and used in cauterizing any part of the body without doing injury to the surrounding parts; and this I accomplish by covering every part of the electrode except the part by which the cauterization is to be done by a substance which is at once a non-conductor of electricity and of heat.

In the accompanying drawings three different forms of my invention are shown.

Similar letters indicate similar parts in the different figures.

Figure 1:

In Figure 1, $a$ is the cauterizing portion of the electrode, and is preferably made of platinum wire, as that will bear a very high degree of heat without fusing. This portion of the electrode can be made in a loop, as shown, or in any form desired, such as that of a blade. The other portions, $b\ b$, of the electrode are preferably made of a cheaper material, such as copper or brass. The portions $b\ b$ of the electrode are embedded in a solid and compact covering, $c$, of asbestus or other material non-conductive both of heat and of electricity. I prefer asbestus, as that material is indestructible either by heat or by acids or by friction, and is hard and strong and compact. The parts $b\ b$ are made to project somewhat from the shield or covering at the opposite end from the cauterizing portion, to enable the electrode to be inserted in a suitable electric handle.

Figure 2:
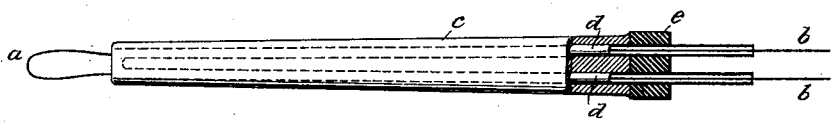

In Fig. 2 a form is shown in which the electrode-wire is movable in the shield. Two tubes, $d\ d$, made of German silver or any other suitable conducting material, are embedded in the covering $c$ of asbestus or other suitable material, and the electrode-wire passes through these tubes, forming a loop at the cauterizing end. The cauterizing portion $a$ is made of platinum, as before, and the portions $b\ b$ of copper or some cheaper material; or the entire electrode-wire may be made of platinum, if desired. The tubes $d\ d$ are made of any suitable conducting material. $e$ is a ring or base, of hard rubber or other suitable non-conducting material, for protecting the asbestus. The electrode is in the form of a snare or ecraseur, and is adapted to be drawn in or let out through the tubes $d\ d$. These tubes $d\ d$ project, as before, to enable the shield to be connected with a suitable electric handle. A recess is made in the tubes at their outer end, as shown, so that the electrode can be entirely covered by the shield when being introduced into or removed from the part to be cauterized.

Figure 3:

In Fig. 3 a form is shown in which the electrode is adapted to be attached to an electric handle and the shield is adapted to move over the electrode. $d\ d$ are two tubes embedded, as before, in a covering of asbestus or other suitable non-conducting substance, having the base-piece $e$ attached. In this form the tubes $d\ d$ do not project from the shield; but the portions $b\ b$ of the electrode themselves project and furnish means for attachment to an electric handle. In this form it is evident that the shield can be moved forward to cover the end of the electrode or drawn back so as to uncover it.

The shield may be attached to the electric handle in any desired manner. One method of attachment is shown in another application of mine of even date herewith for electro-cautery instruments for use in surgery.

When these electrodes are used in any part of the body, the protecting-shield prevents the portions $b\ b$ from coming into contact with the surrounding parts, and, being non-conductive both of heat and electricity, protects those parts from injury. During the introduction into or removal of the electrode from any part of the body the electrode is entirely covered by the shield, and thus all injury to the surrounding parts is prevented.

What I claim as new, and desire to secure by Letters Patent, is—

1. Shielded cautery electrodes consisting of electrical conductors terminating at the end in the usual cautery loop or blade, of platinum or other suitable metal, and embedded, except at the cauterizing parts, in a compact covering of asbestus solid with the electrode, substantially as and for the purposes set forth.

2. A shielding-holder for a snare or ecraseur or other cauterizing-electrode, consisting of two insulated metallic or suitably-rigid electrically-conducting tubes embedded in a solid and compact covering of asbestus, and a recess at the outer end of the tubes, whereby the usual cautery-snare or ecraseur or other cautery electrode may be held and supported and shielded from contact with the sides of cavities, &c., substantially as and for the purposes set forth.

3. A shielding-holder for a snare or ecraseur or other suitable electrode, consisting of two suitably-rigid tubes coated with a solid and compact covering of asbestus, and a recess at the outer ends of the tubes, whereby the usual cautery-snare or ecraseur or other cautery-electrode may be held and supported and shielded from contact with the sides of cavities, &c., substantially as and for the purposes set forth.

DAVID H. GOODWILLIE.

Witnesses:
R. N. KENYON,
W. H. KENYON.